US012590463B2

(12) United States Patent
Spadola

(10) Patent No.: US 12,590,463 B2
(45) Date of Patent: Mar. 31, 2026

(54) PRIVACY SHADE

(71) Applicant: Frank Spadola, Yonkers, NY (US)

(72) Inventor: Frank Spadola, Yonkers, NY (US)

( * ) Notice: Subject to any disclaimer, the term of this patent is extended or adjusted under 35 U.S.C. 154(b) by 0 days.

(21) Appl. No.: 17/450,904

(22) Filed: Oct. 14, 2021

(65) Prior Publication Data

US 2022/0112722 A1      Apr. 14, 2022

Related U.S. Application Data

(60) Provisional application No. 63/091,888, filed on Oct. 14, 2020.

(51) Int. Cl.
| | |
|---|---|
| *E04F 10/04* | (2006.01) |
| *A47H 1/02* | (2006.01) |
| *A47H 1/10* | (2006.01) |
| *A47H 1/102* | (2006.01) |
| *A47H 1/142* | (2006.01) |
| *A47H 13/02* | (2006.01) |
| *E04F 10/06* | (2006.01) |
| *F21S 9/03* | (2006.01) |
| *G03B 21/58* | (2014.01) |
| *H02S 20/26* | (2014.01) |

(52) U.S. Cl.
CPC ........... *E04F 10/0648* (2013.01); *A47H 1/10* (2013.01); *E04F 10/04* (2013.01); *E04F 10/0603* (2013.01); *F21S 9/035* (2013.01); *G03B 21/58* (2013.01); *H02S 20/26* (2014.12); *A47H 1/02* (2013.01); *A47H 1/102* (2013.01); *A47H 1/142* (2013.01); *A47H 13/02* (2013.01)

(58) Field of Classification Search
CPC ........ E04H 15/58; E04H 15/005; E04F 10/02; E04F 10/04; E06B 9/42; E06B 9/56; E06B 9/58; E06B 2009/587; E06B 9/64; E06B 9/78
See application file for complete search history.

(56) References Cited

U.S. PATENT DOCUMENTS

| | | | | |
|---|---|---|---|---|
| 715,501 | A | * | 12/1902 | McNamara ............. E04F 10/04 |
| | | | | 160/82 |
| 2,660,186 | A | | 11/1953 | Marshall et al. |
| 4,068,673 | A | | 1/1978 | Bernardi |
| 4,744,403 | A | * | 5/1988 | Hausmann .......... E04F 10/0607 |
| | | | | 160/310 |
| 5,613,543 | A | * | 3/1997 | Walton .................... E04G 21/28 |
| | | | | 160/265 |
| 5,857,658 | A | * | 1/1999 | Niemiec ................ A47B 37/04 |
| | | | | 248/539 |

(Continued)

OTHER PUBLICATIONS https://web.archive.org/web/20160325081423/https://www.deckexpressions.com/solar-post-caps/ (Year: 2016).*

*Primary Examiner* — Johnnie A. Shablack
*Assistant Examiner* — John W Hanes, Jr.

(57) ABSTRACT

A portable privacy shade apparatus is configured to attach to a railing of a deck or to a fence. The shade apparatus includes a frame having first and second legs. A lateral crossbar connects top portions of the two legs and extends between them. Curtains are suspended from the lateral crossbar to cover an opening outlined by the frame. The transverse member may also be used to mount a rolled-up screen mounted on a spool inside the transverse member, blinds, or other shade or privacy barrier.

4 Claims, 16 Drawing Sheets

(56) References Cited

U.S. PATENT DOCUMENTS

| | | | | |
|---|---|---|---|---|
| 6,006,811 | A * | 12/1999 | Brutsaert | E04F 10/0607 |
| | | | | 135/141 |
| 6,375,146 | B1 * | 4/2002 | Painchaud | F16M 13/022 |
| | | | | 248/539 |
| 6,513,566 | B2 * | 2/2003 | Larin | E04F 10/04 |
| | | | | 182/178.3 |
| 6,702,245 | B1 * | 3/2004 | Otterman | E04H 12/2276 |
| | | | | 248/536 |
| 6,942,002 | B1 * | 9/2005 | Williams | A47H 21/00 |
| | | | | 160/265 |
| 7,201,442 | B1 * | 4/2007 | Decosta, Jr. | A47C 7/66 |
| | | | | 248/539 |
| 7,377,490 | B1 * | 5/2008 | Khosravian | E06B 9/08 |
| | | | | 160/24 |
| 7,585,020 | B1 | 9/2009 | Wahl, Jr. | |
| 7,594,633 | B2 * | 9/2009 | Carnevali | F16M 11/046 |
| | | | | 248/404 |
| 8,393,343 | B2 * | 3/2013 | VanVonderen | E04F 10/04 |
| | | | | 135/98 |
| 8,469,077 | B1 * | 6/2013 | Allard | G03B 21/58 |
| | | | | 160/71 |
| 9,038,648 | B1 * | 5/2015 | Xie | E04H 15/58 |
| | | | | 135/120.3 |
| 9,187,922 | B1 * | 11/2015 | Phillips, Jr. | E04H 15/58 |
| 9,567,800 | B1 * | 2/2017 | Newport | A47H 1/022 |
| 9,903,530 | B1 * | 2/2018 | Martz | E04F 10/02 |
| 10,099,751 | B1 * | 10/2018 | Greer | H02S 30/20 |
| 10,273,750 | B2 * | 4/2019 | Fleischman | E04B 2/7433 |
| 10,329,789 | B1 * | 6/2019 | Bechtle | B65F 1/1426 |
| 10,370,866 | B1 * | 8/2019 | Sanders | A45B 25/18 |
| 10,702,085 | B1 * | 7/2020 | Newport | A47H 1/142 |
| 10,844,657 | B2 * | 11/2020 | Fleischman | E06B 9/581 |
| 10,934,739 | B1 * | 3/2021 | Vazquez | E04H 15/44 |
| 11,001,326 | B1 * | 5/2021 | Bourassa | B62J 17/08 |
| 11,131,090 | B2 * | 9/2021 | Klein | B32B 3/08 |
| 2001/0022217 | A1 * | 9/2001 | Larin | E04F 10/04 |
| | | | | 160/351 |
| 2007/0034758 | A1 * | 2/2007 | Bates | E04H 12/2276 |
| | | | | 248/218.4 |
| 2007/0108363 | A1 * | 5/2007 | Metheny | A45B 11/00 |
| | | | | 248/539 |
| 2007/0108364 | A1 * | 5/2007 | Metheny | E04F 10/04 |
| | | | | 248/541 |
| 2008/0285294 | A1 * | 11/2008 | Kim | F21V 17/007 |
| | | | | 362/145 |
| 2012/0103377 | A1 * | 5/2012 | Sheridan | E04H 15/58 |
| | | | | 135/96 |
| 2012/0145207 | A1 * | 6/2012 | VanVonderen | E04H 15/28 |
| | | | | 135/98 |
| 2013/0240007 | A1 * | 9/2013 | Ashton | E04H 15/58 |
| | | | | 135/161 |
| 2014/0360687 | A1 * | 12/2014 | Ogilvie | E04H 15/005 |
| | | | | 160/377 |
| 2015/0034261 | A1 * | 2/2015 | Lang | E06B 9/44 |
| | | | | 160/319 |
| 2015/0259946 | A1 * | 9/2015 | Verhelst | E04H 15/06 |
| | | | | 135/96 |
| 2015/0376937 | A1 * | 12/2015 | Buermann | E04F 10/02 |
| | | | | 248/48.2 |
| 2016/0368571 | A1 * | 12/2016 | Levin | E04H 15/18 |
| 2017/0030083 | A1 * | 2/2017 | Matturro | E04F 10/02 |
| 2017/0241158 | A1 * | 8/2017 | Dresch | E04H 15/54 |
| 2017/0265646 | A1 * | 9/2017 | Rowe, Jr. | E04H 15/46 |
| 2017/0321426 | A1 * | 11/2017 | Greer | E04H 15/06 |
| 2017/0362852 | A1 * | 12/2017 | Sartin | E04H 15/54 |
| 2017/0370107 | A1 * | 12/2017 | Dubau | E04F 10/0655 |
| 2018/0016839 | A1 * | 1/2018 | Jeong | E06B 9/08 |
| 2018/0106046 | A1 * | 4/2018 | Castel | E04F 10/10 |
| 2018/0310745 | A1 * | 11/2018 | Giri | A47H 1/13 |
| 2018/0352921 | A1 * | 12/2018 | Arndt | A45B 19/12 |
| 2019/0032339 | A1 * | 1/2019 | Matturro | E04H 15/58 |
| 2019/0186167 | A1 * | 6/2019 | Ji | E04H 15/008 |
| 2019/0194972 | A1 * | 6/2019 | Brian | E04H 15/46 |
| 2019/0271155 | A1 * | 9/2019 | Gilbertson | H02G 3/386 |
| 2019/0277053 | A1 * | 9/2019 | Yang | E04H 15/52 |
| 2019/0323285 | A1 * | 10/2019 | Wong | E06B 9/60 |
| 2020/0024862 | A1 * | 1/2020 | Bianchi | E04H 15/003 |
| 2020/0071994 | A1 * | 3/2020 | Lin | E06B 9/42 |
| 2020/0115920 | A1 * | 4/2020 | Ramos | E04H 15/44 |
| 2020/0123847 | A1 * | 4/2020 | Konopelski | E06B 9/50 |
| 2020/0157835 | A1 * | 5/2020 | Dresch | E04H 15/46 |
| 2020/0157882 | A1 * | 5/2020 | Chen | E06B 9/42 |
| 2020/0318430 | A1 * | 10/2020 | Heissenberg | E06B 9/582 |
| 2020/0340267 | A1 * | 10/2020 | Zemskov | B62B 9/14 |
| 2020/0386045 | A1 * | 12/2020 | Lemaitre | E06B 9/46 |
| 2020/0399905 | A1 * | 12/2020 | Pan | E04H 15/54 |
| 2021/0025191 | A1 * | 1/2021 | Volin | E04H 15/005 |
| 2021/0040767 | A1 * | 2/2021 | Youngblut | E04H 15/001 |
| 2021/0054646 | A1 * | 2/2021 | Volin | A47B 85/06 |
| 2021/0137296 | A1 * | 5/2021 | Tan | A47H 1/142 |
| 2022/0081966 | A1 * | 3/2022 | Arendts | E06B 9/15 |
| 2022/0081969 | A1 * | 3/2022 | Wang | E06B 9/42 |

* cited by examiner

3' - 6'

PRIVACY SHADE

PRIORITY CLAIM

This application claims priority to U.S. Patent Application No. 63/091,888, filed Oct. 7, 2020, and titled, "PRIVACY SHADE APPARATUS," the contents of which is incorporated by reference in its entirety.

FIELD

The present invention generally relates to a privacy shade apparatus. Specifically, the present invention relates to a portable privacy shade apparatus configured to attach to a rail or serve as a free-standing privacy shade.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a privacy shade apparatus attachable to an existing railing. The privacy shade apparatus also includes first and second legs. The apparatus also includes a transverse member extending between respective top portions of said first and second legs and connecting said first and second legs. The apparatus also includes where said transverse member houses a rolled-up screen mounted on a spool inside said transverse member, where the screen is deployed by unrolling the screen thereby forming a barrier in a void space outlined by the frame, where the screen is configured to fill the void space when the screen is fully deployed. Other embodiments of this aspect include corresponding computer systems, apparatus, and computer programs recorded on one or more computer storage devices, each configured to perform the actions of the methods.

Implementations may include one or more of the following features. The privacy shade apparatus where the screen is manually deployed by grasping and pulling a peripheral edge of said screen, causing the screen to unroll and extend into the void space. Said spool is a motorized spool which extends or retracts the screen by rotating in a clockwise or counterclockwise direction, where said motorized spool is activated and deactivated by remote control or by using a button or switch on the apparatus. At least one of said top portions of said legs includes a solar cap for receiving and storing solar power. At least one of said legs includes a built-in light powered by said solar cap. Said motorized spool is powered by said solar cap. Said first and second legs are configured to coaxially attach to first and second posts, respectively, of an existing railing. An l-shaped bracket is used to attach said legs to said posts. Said first and second legs are configured to coaxially receive a top portion of first and second posts, respectively, of an existing railing. Said transverse member has a u-shaped cross section and the opening in said u-shape is the opening through which the screen is deployed. Said first and second legs are extendable. Said extendable legs extend telescopically. Each opposite end of said spool is installed in a corresponding cradle on each opposite end of said transverse member. A release mechanism in at least one cradle is used to eject the spool with the screen mounted thereon. Said screen is a projection screen used for displaying still or moving images. Implementations of the described techniques may include hardware, a method or process, or computer software on a computer-accessible medium.

One general aspect includes a method of installing a privacy shade apparatus on an existing railing. The method of installing also includes removing caps from two existing rail posts. The installing also includes attaching the shade apparatus to said rail posts, the shade apparatus may include: first and second legs. The installing also includes a transverse member extending between respective top portions of said first and second legs and connecting said first and second legs. The installing also includes where said transverse member houses a rolled-up screen mounted on a spool inside said transverse member, where the screen is deployed by unrolling the screen thereby forming a barrier in a void space outlined by the frame, where the screen is configured to fill the void space when the screen is fully deployed. The installing also includes coaxially attaching the legs of said shade apparatus frame onto the rail posts where each leg corresponds to a respective one of said rail posts. Other embodiments of this aspect include corresponding computer systems, apparatus, and computer programs recorded on one or more computer storage devices, each configured to perform the actions of the methods.

Implementations may include one or more of the following features. The method where each of said first and second legs is configured to coaxially receive a top portion of its corresponding post. Said transverse member has a u-shaped cross section and the opening in said u-shape is the opening through which the screen is deployed. Said first and second legs are extendable. At least one of said top portions of said legs includes a solar cap for receiving and storing solar power. Implementations of the described techniques may include hardware, a method or process, or computer software on a computer-accessible medium.

BRIEF DESCRIPTION OF THE DRAWINGS

The features and advantages of the present disclosure will be more fully understood with reference to the following detailed description when taken in conjunction with the accompanying figures, wherein.

DETAILED DESCRIPTION

The present invention generally relates to a privacy shade apparatus. Specifically, the present invention relates to a portable privacy shade apparatus configured to attach to a railing or fence.

Figure 12:
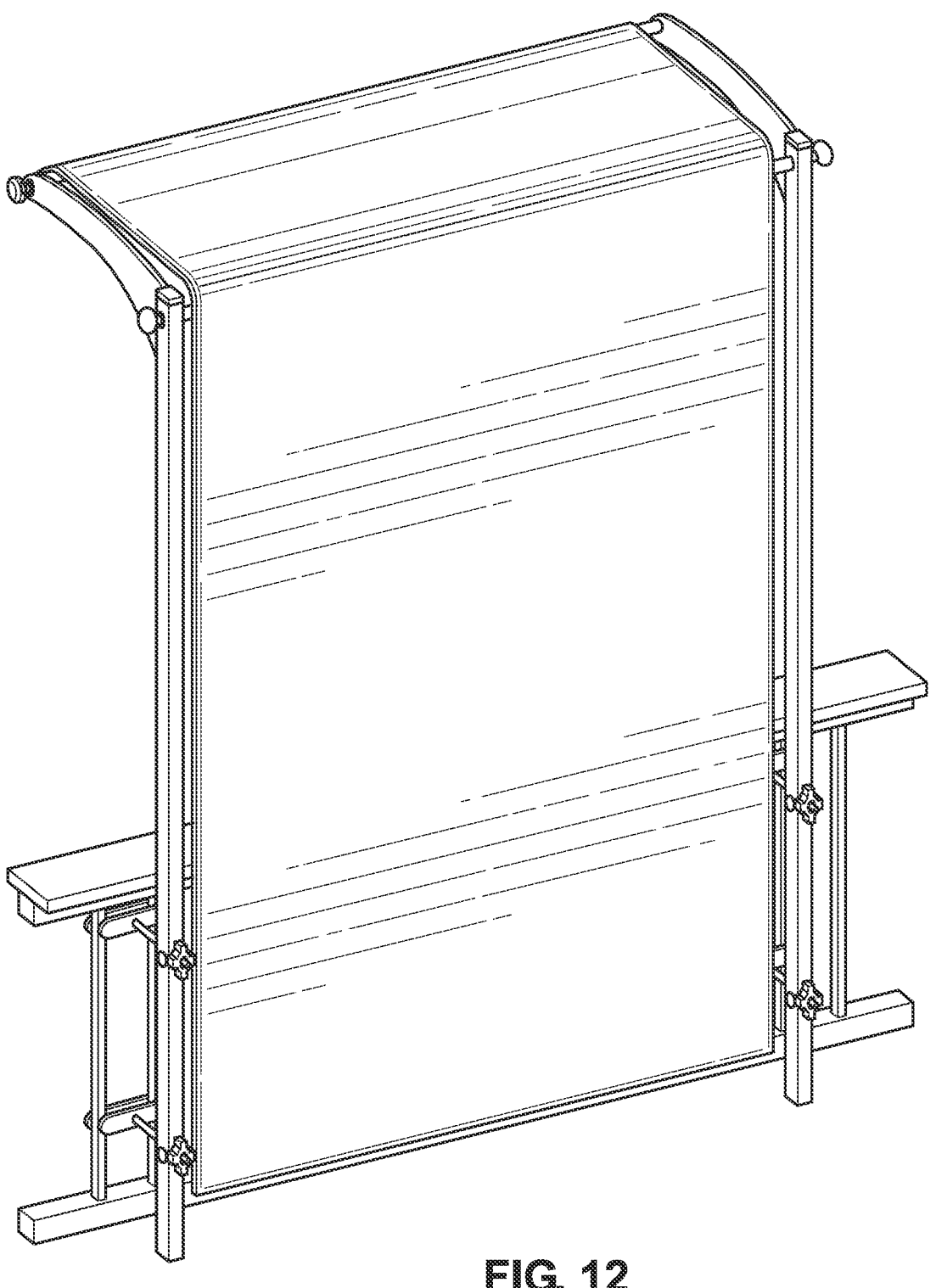

According to an embodiment of the present invention as depicted in FIG. 12, a privacy shade apparatus 40 is provided which attaches to an existing railing, such as a deck rail, patio rail or the like. The shade apparatus includes a frame with two legs 42a, 42b and a lateral crossbar 46 connecting the two legs. The crossbar extends between respective top portions of the two legs. The crossbar houses a rolled-up screen 50 mounted on a spool 48 inside the crossbar.

The screen 50 is deployed by unrolling the screen 50, such as by grasping an edge portion of the screen 50 or a handle attached to the edge of the screen 50 and pulling the screen 50 out, as shown in FIG. 12. The screen 50 may be deployed or unrolled to any length desired and is fully deployed when the screen 50 is completely unrolled. Alternatively, the screen 50 may be fully deployed when a predetermined amount of screen 50 is unrolled such as to cover a particular space. Furthermore, the spool 48 may include a simple retraction mechanism by which the screen 50 can be retracted and stowed back in the crossbar housing by, for example, tugging on the extended screen 50 with sufficient force to activate the retraction mechanism. Such manual retraction mechanisms are well known in the art.

In an alternate embodiment, the spool is motorized and thus may be deployed by activating a spool motor which rotates the spool clockwise or counterclockwise to deploy the screen and rotates the spool in the opposite direction to retract the screen. In this embodiment, the spool 56 motor may be activated and deactivated by pressing a button on the shade apparatus or pressing a button on a remote control. The spool continues to rotate until deactivated by a user or until the screen is fully deployed or unrolled. Moreover, the spool motor may be activated and deactivated by the same button or separate buttons, such as a start and stop button.

The term button shall be broadly interpreted to cover mechanical buttons, touch screen buttons, switches, etc.

Once the screen is deployed it forms a barrier in a void space outlined by the frame. The screen is configured to fill the void space when the screen is fully deployed. However, the screen may be unrolled or lowered to any extent desired so that it fills some portion of the void space. The screen may be any color or suitable material but is preferably a privacy shade that blocks light and prevents people from seeing through the screen.

In an alternate embodiment, the privacy shade apparatus may include blinds (e.g., horizontal or vertical blinds) instead of the above-described screen. For example, cordless, wand operated and/or cord operated blinds may be attached to the crossbar which serves as a headrail for the blinds. However, one of ordinary skill in the art will appreciate that there are other ways to attach blinds to the shade apparatus, such as by using a customized headrail as a substitute for the crossbar. Moreover, any type of blinds or shades may be used with the privacy shade apparatus such as vertical blinds, venetian blinds, mini blinds, micro blinds, panel blinds, pleated shades, cellular shades, roman shades, roller shades, tie-up shades, solar shades, outdoor shades, skylight shades, and smart blinds. The blinds may be made of any suitable material such as wood, faux wood, plastic, metal, paper, natural fabric, or synthetic fabric. The workings and components parts of blinds are well known in the art and are therefore not described here in detail.

Figure 1:
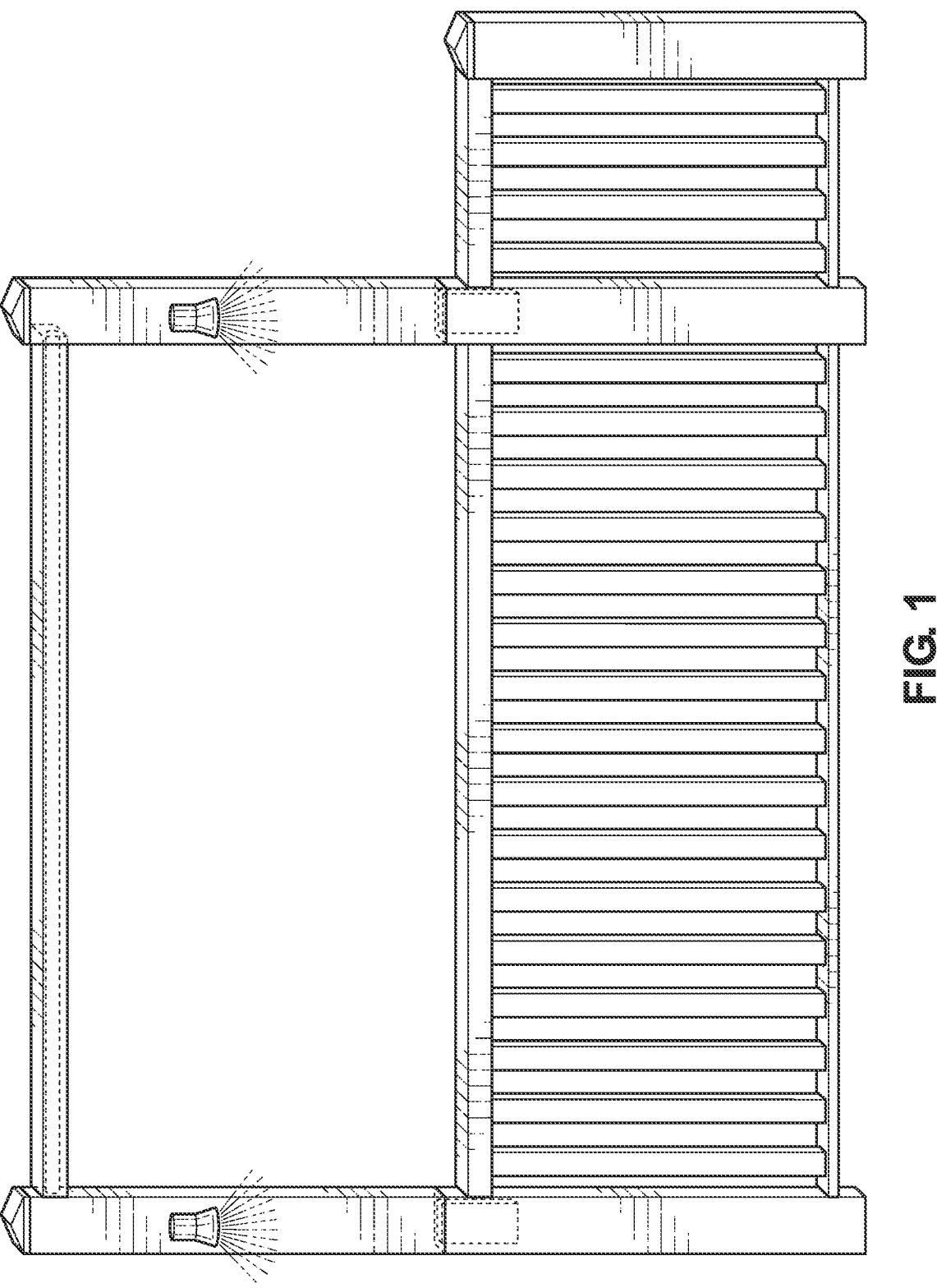
FIG. 1 is a front elevation view of a privacy shade apparatus and component parts, in accordance with an embodiment of the present invention.

According to an embodiment of the invention depicted in FIG. 1, the frame legs 102a, 102b of the shade apparatus are configured to coaxially attach to the spaced apart posts 104a, 104b of an existing railing. The frame legs are thus designed to be spaced apart to align with the spaced apart posts. In order to achieve such an alignment, the crossbar 106 may be an adjustable crossbar that adjusts the spacing between frame legs so they can be aligned with the railing posts. Railing posts commonly have a standard spacing between them which may obviate the need for an adjustable crossbar, but embodiments of the invention both a static and adjustable crossbar. Adjustable crossbars are well known in the art such as telescopically extendable crossbars and the like.

Railing posts commonly include a decorative top cap that should be removed prior to attaching the shade apparatus frame to the posts. However, the frame legs 102a, 102b may be designed to fit over the top cap as explained more fully below. The top cap may be unscrewed or otherwise detached from the railing post. However, some embodiments of the present invention are configured to attach to the railing post even if the top cap is not removed.

In one embodiment, the frame legs 102a, 102b are configured to coaxially receive a top portion of each corresponding post 104a, 104b they are attached to. As discussed above, it may be necessary to remove the top caps of the posts before installing the frame legs over the posts. In this embodiment, the frame legs are at least partially hollow so they can fit over the top end portions of the railing posts like a sleeve. The top rail of the fence/railing prevents the hollowed legs from sliding too far down the posts, i.e., the legs can only slide over and cover the portion of the posts that extends above the top rail of the fence.

In an alternative embodiment, each frame leg includes an attachment member such as a pin, peg, or other extending member that fits into an opening exposed by removing the top cap of the corresponding post. The pin may be configured to fit snugly in the exposed opening to provide a stable connection between the frame leg and the post.

Figure 2:
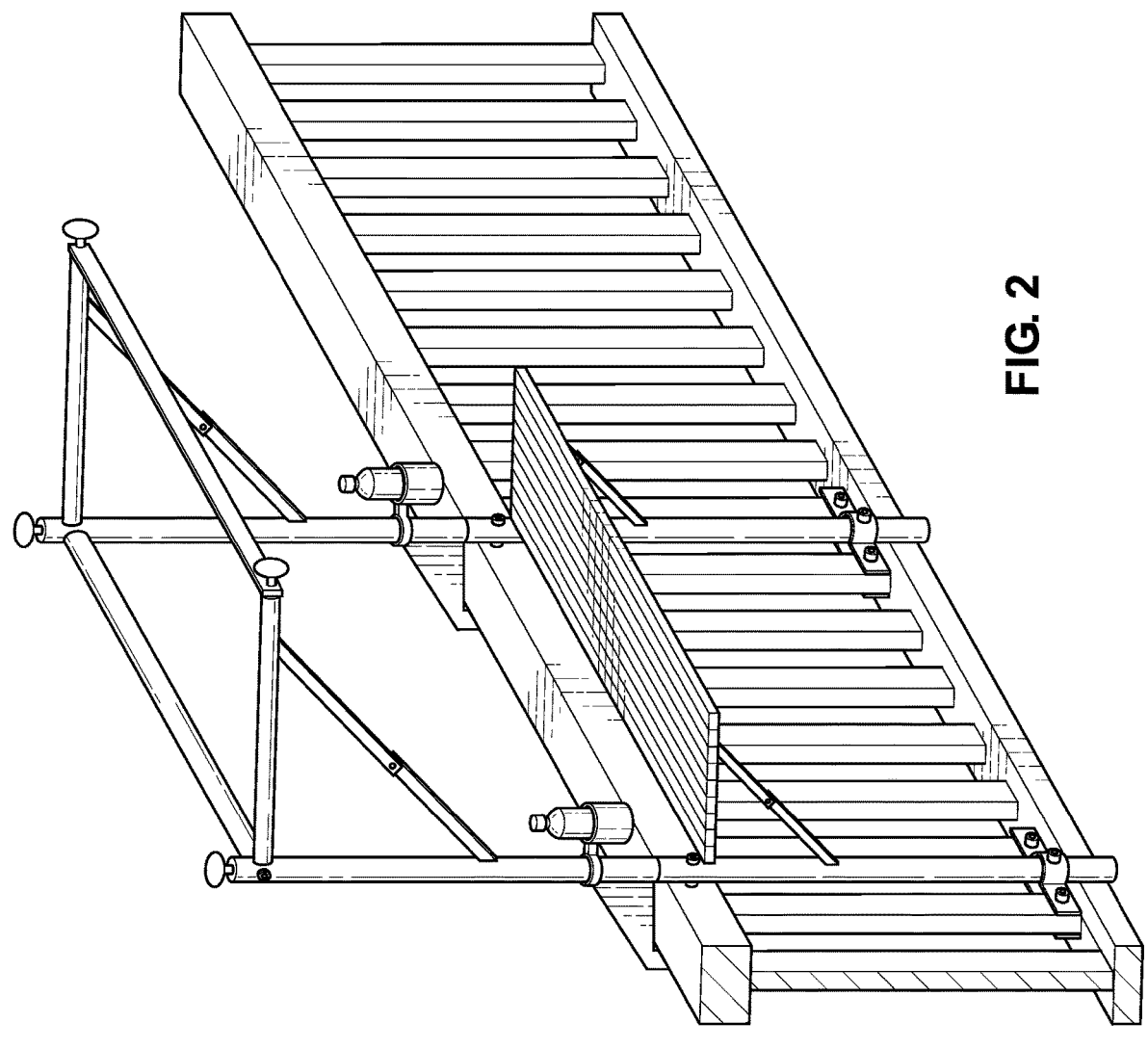
FIG. 2 is a front elevation view of a privacy shade apparatus and component parts and accessories, in accordance with another embodiment of the present invention.
Figure 3:
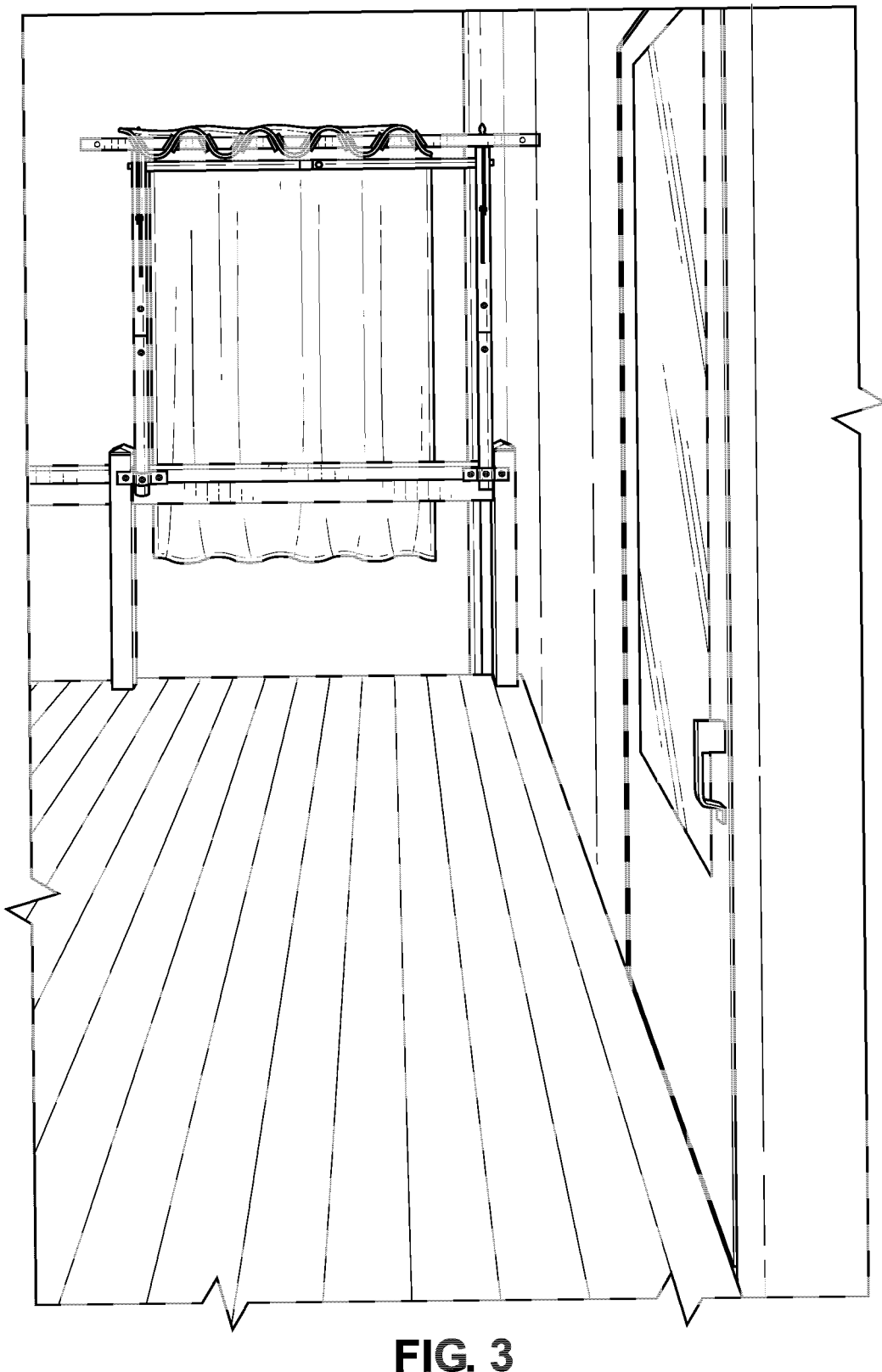
FIG. 3 is an environmental perspective view of a privacy shade apparatus, in accordance with another embodiment of the present invention.
Figure 4:
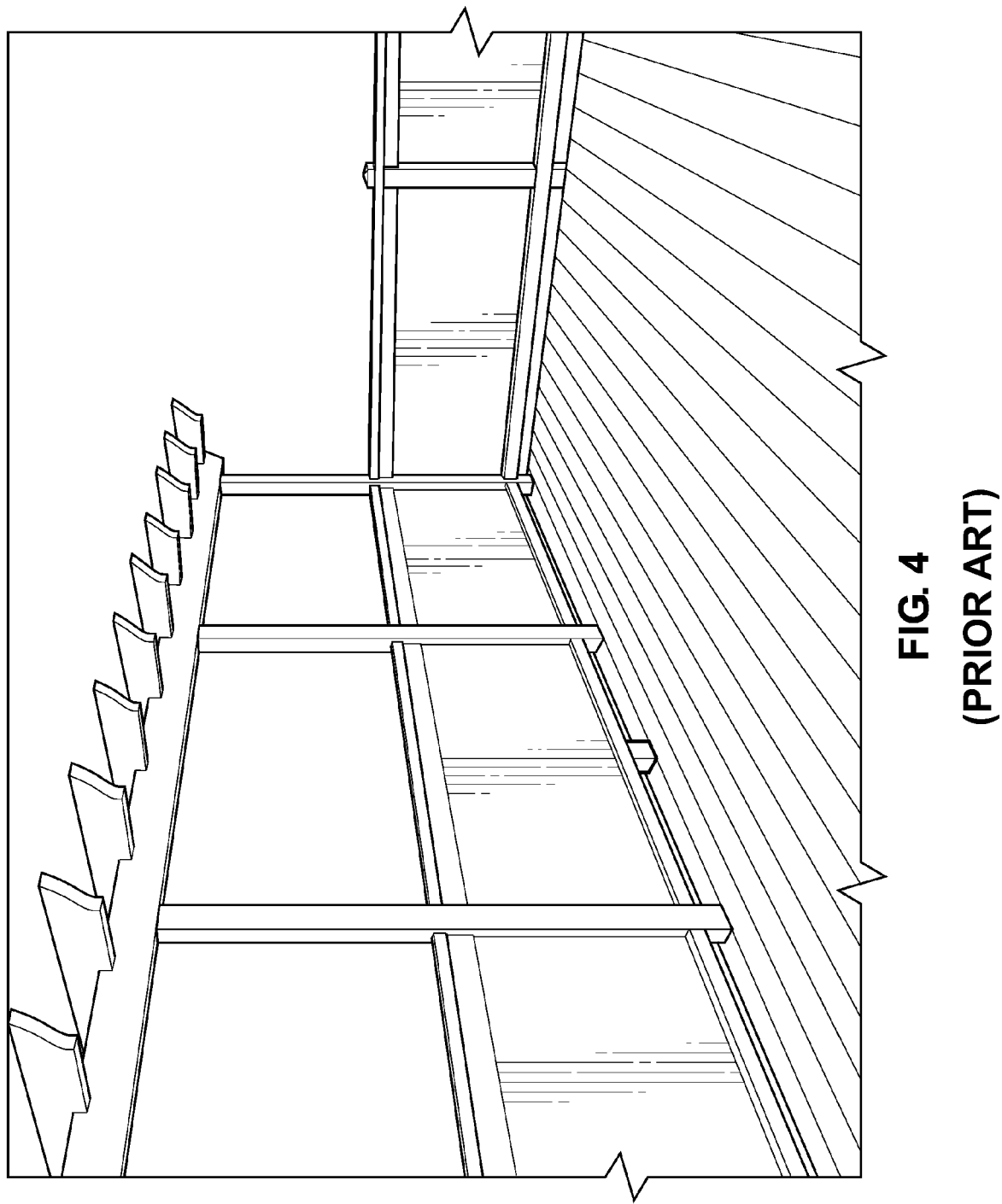
FIG. 4 illustrates an exemplary environment in which the privacy shade apparatus can be installed and used.

In a further embodiment, the frame legs may or may not be hollow and are attached to their respective posts using a combination of a bracket and rotatable levers attached to a lower half or bottom portion of each leg, as depicted in FIG. 2. In this embodiment the frame legs extend below the top rail 210 and may extend all the way to the base rail of the fence. Use of this embodiment assumes that there are spaced apart spindles 204a, 204b that extend between the top rail and the base rail. The bracket is preferably an L-shaped bracket 210a, 210b with a short side and a long side. The long side of the bracket extends horizontally from approximately the middle of the frame leg and the short side extends down vertically. In other words, the end of the long horizontal side of the L-shaped bracket is attached to or embedded in the leg so that the bracket extends horizontally from the leg and forms a hook thus allowing the bracket to clamp onto the top rail. In one embodiment, the bracket includes a rubber, foam, plastic, or fabric layer where it contacts the top rail in order to avoid damage to the top rail. Moreover, the bracket may be an adjustable bracket where the long side of the bracket may be extended or retracted to securely clamp the top rail. A person of ordinary skill in the art will recognize that adjustable brackets are well known in the art.

Figure 13:
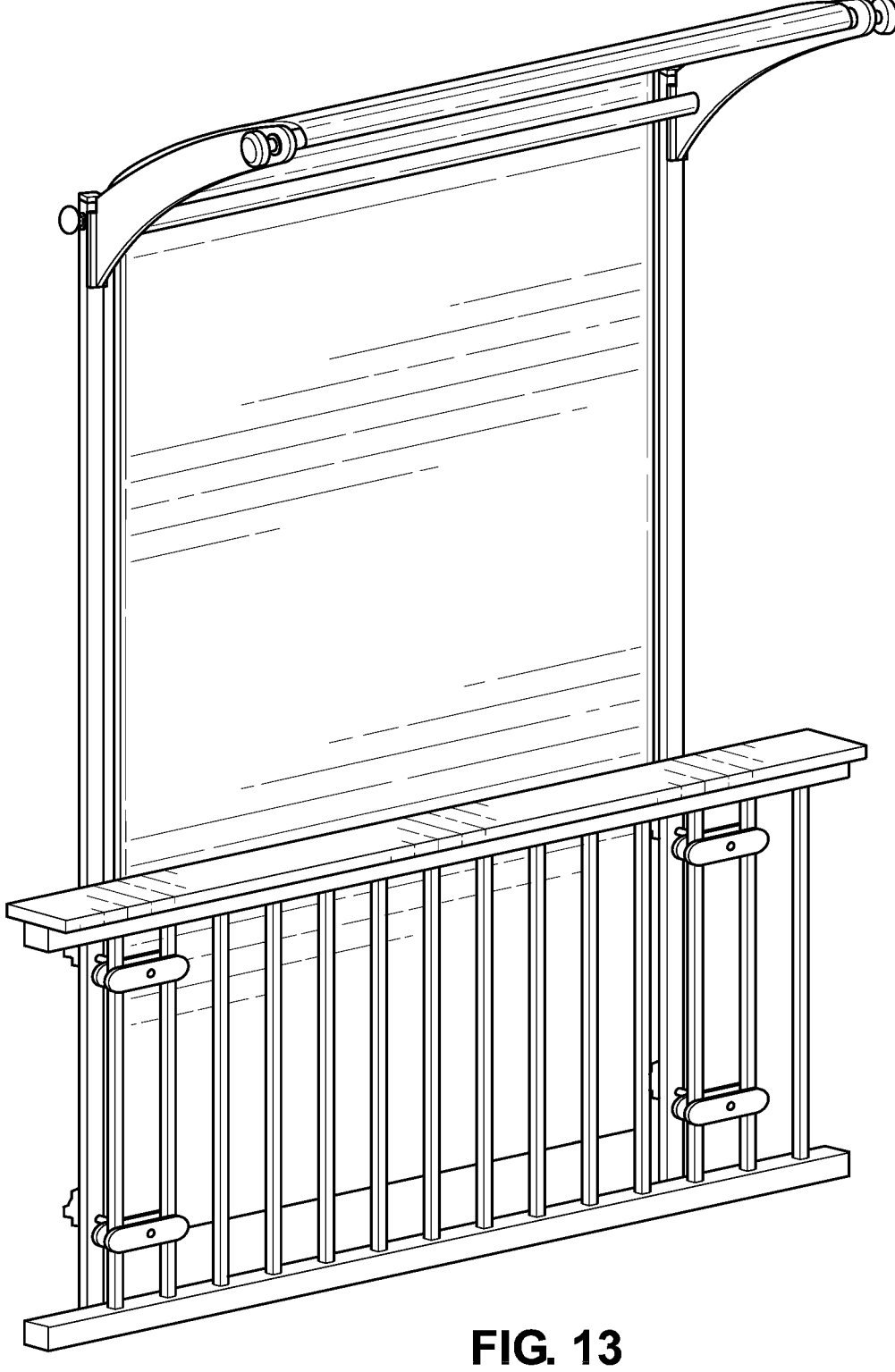
Figure 14:
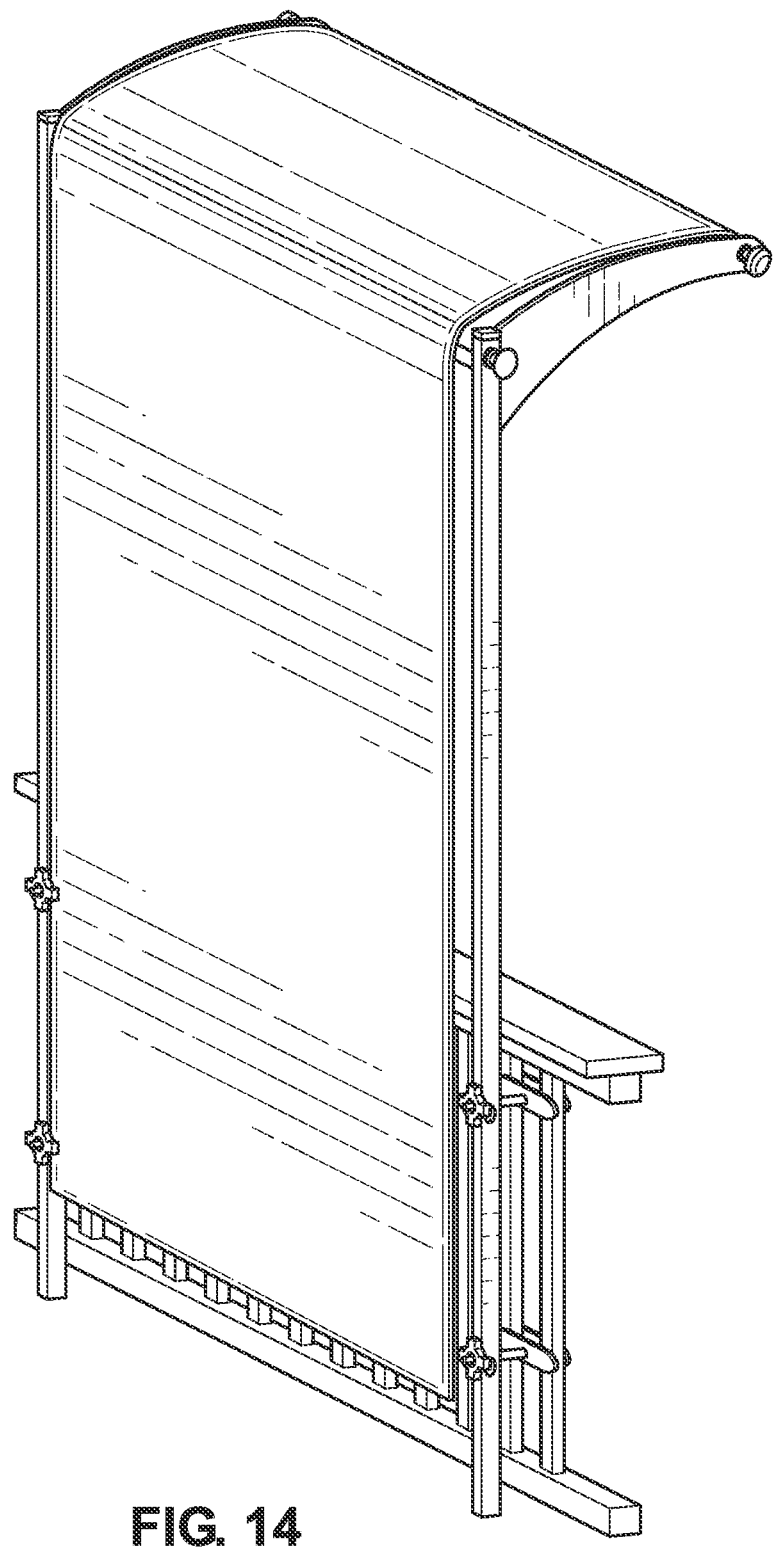
Figure 15:
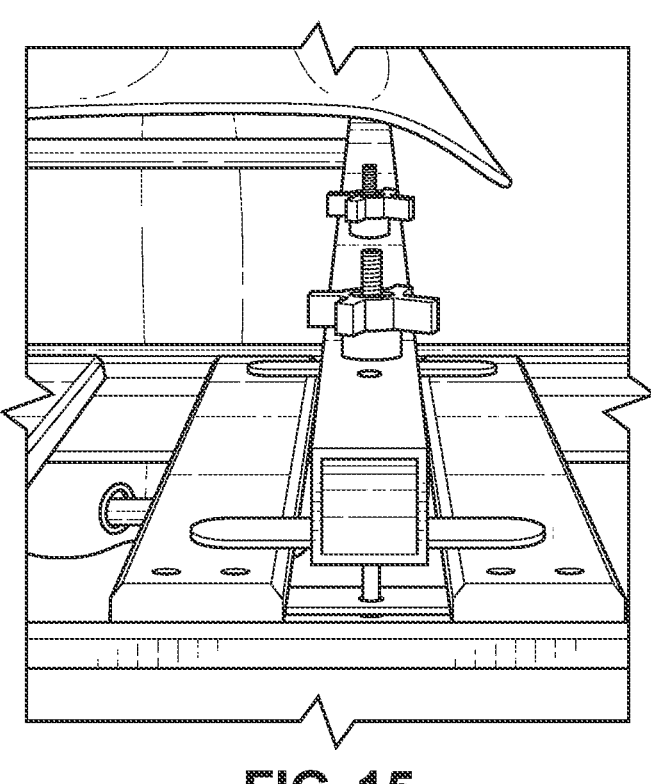

In an alternate embodiment depicted in FIG. 13, The lower half of the frame leg 310a, 310b (i.e., the portion of the leg below the bracket) extends below the top rail 312 and may extend as far as the base rail 313. A rotatable lever mechanism 314a-d is attached at some point along the lower half of the leg, preferably near the lower end of the leg. The rotatable lever mechanism includes two opposing, aligned levers on either side of the leg with a rotatable member extending through the leg and connecting the opposing levers. The rotatable lever mechanism is configured to rotate from a vertical position (i.e., open position) to a horizontal position (i.e., closed or locked position) and trap adjacent railing spindles, disposed on either side of the leg, between the opposing levers. Furthermore, a stopper connected to the rotatable member may be used to limit rotation of the levers to 90 degrees from the vertical position so that lever rotation is stopped in the locked position (i.e., the horizontal position). Moreover, a biasing or friction means may be applied to the rotatable member to serve as a counterforce to rotation, so the levers do not move freely and are not too easily rotated.

In one embodiment the opposing levers are spaced apart to snugly trap a spindle when rotated into the locked position. The levers are thus able to clamp the adjacent spindles on either side of the leg. Just as with the bracket, the levers may include a rubber, foam, plastic, or fabric layer to avoid damage to the spindles trapped tightly therebetween. In addition, the levers may include an indented portion dimensioned to fit around or grasp the spindle body so that when the levers are in a closed position, the spindle body fits snugly between the indented portions of the opposing levers. However, in another embodiment the levers may be spaced apart to avoid contact with the spindle interposed therebetween when the levers are rotated into the locked position, in which case the levers do not clamp or grasp the spindles.

Although the above embodiment is described in terms of a single rotatable lever mechanism disposed along a lower half of the leg, one will appreciate that one or more additional rotatable lever mechanisms may be attached to each leg. For example, a second rotatable lever mechanism may be attached somewhere along the top half of the leg providing a further means to secure the shade apparatus to the railing.

Accordingly, the shade apparatus may be thus secured to a railing by first hooking or clamping the bracket to the top rail of the fence/railing. This can be done by resting the bracket over the top rail so that the rail is between the short vertical side and long horizontal side of the L-shaped bracket. The rotatable lever mechanism is then rotated from the open position to the locked position, thereby trapping adjacent spindles between the opposing levers on either side of the frame leg. To detach the shade apparatus from the railing, a user simply rotates the levers back to the open position and lifts the apparatus off the top rail.

In a further embodiment a metal or plastic sleeve may be used to wrap around the frame leg and corresponding post (i.e., the bottom portion of the frame leg and top portion of the post) in order to secure them together. The sleeve may be secured and tightened around the leg and post using a fastener-nut combination, straps, or any other securing means known in the art.

According to one embodiment of the present invention, the lateral crossbar has a U-shaped cross section and the spool is suspended within the lateral crossbar. The opening in the U-shape is the opening through which the screen is deployed. In other words, the crossbar is in the form of an elongated U-shaped bracket. However, the crossbar is not limited to any particular shape. For example, the crossbar may have a rectangular or any other geometric cross section (e.g., circular, polygonal, etc.) and is hollow to accommodate the spool suspended therein. In any case, the crossbar will always include an opening for deploying the screen.

One or both opposite ends of the crossbar may be equipped with a cradle for retaining one or both opposite ends of the spool. In one embodiment, each opposite end of the spool 68 is installed in a corresponding cradle on each opposite end of the crossbar. A release mechanism in at least one cradle is used to eject the spool with or without the screen mounted thereon.

Figure 5:
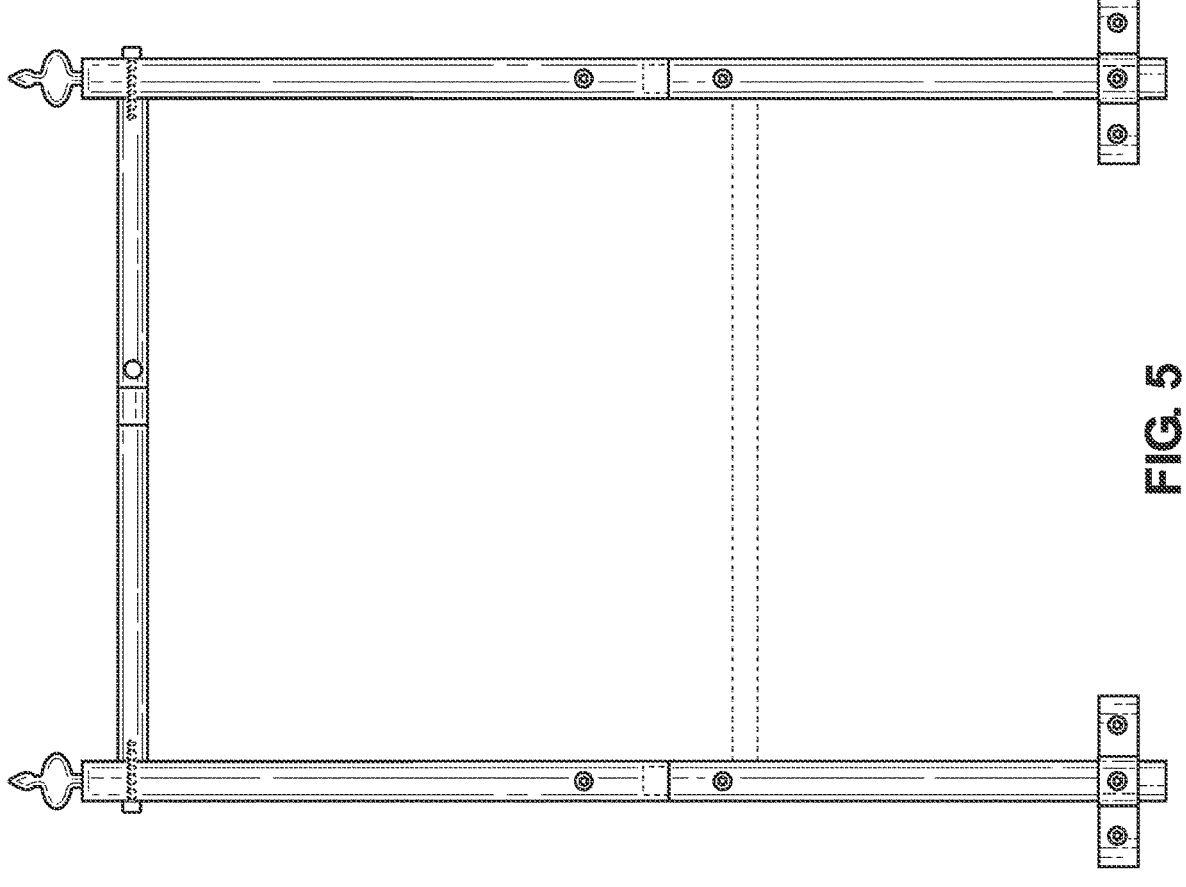
FIG. 5 is a front elevation view of a privacy shade apparatus and component parts and accessories, in accordance with an embodiment of the present invention.
Figure 6B:
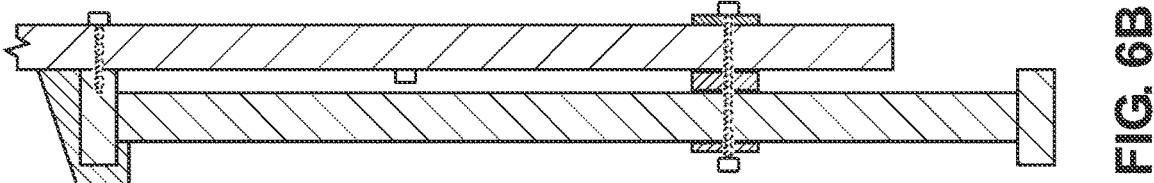
FIG. 6B is a sectional view showing a leg of the privacy shade apparatus attached to a railing in accordance with an embodiment of the present invention.
Figure 6A:
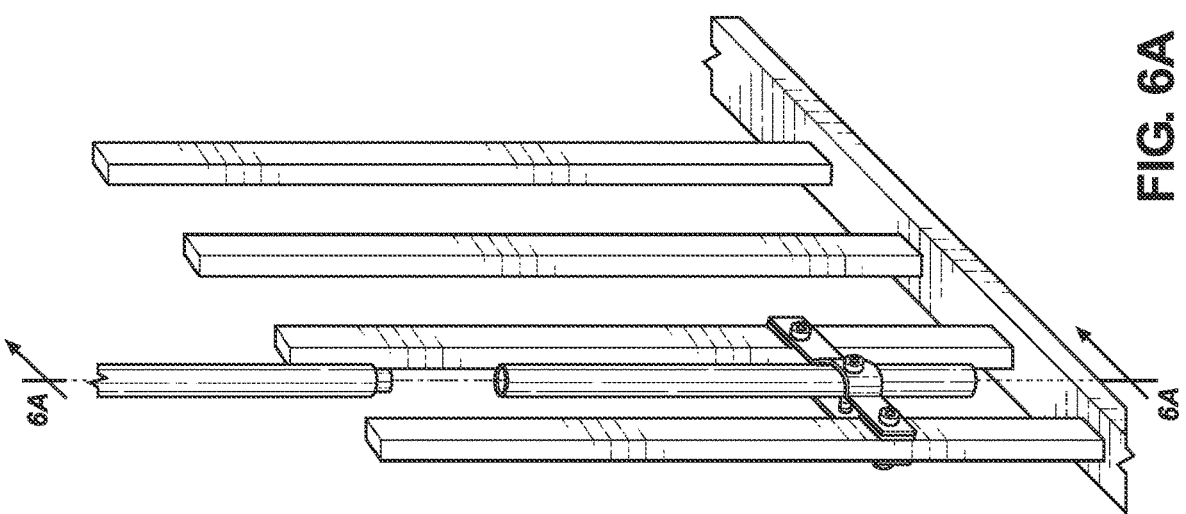
FIG. 6A is a partial perspective view showing a leg of the privacy shade apparatus attached to a railing in accordance with an embodiment of the present invention.
Figures 7A, 7B, 7C, 7D:
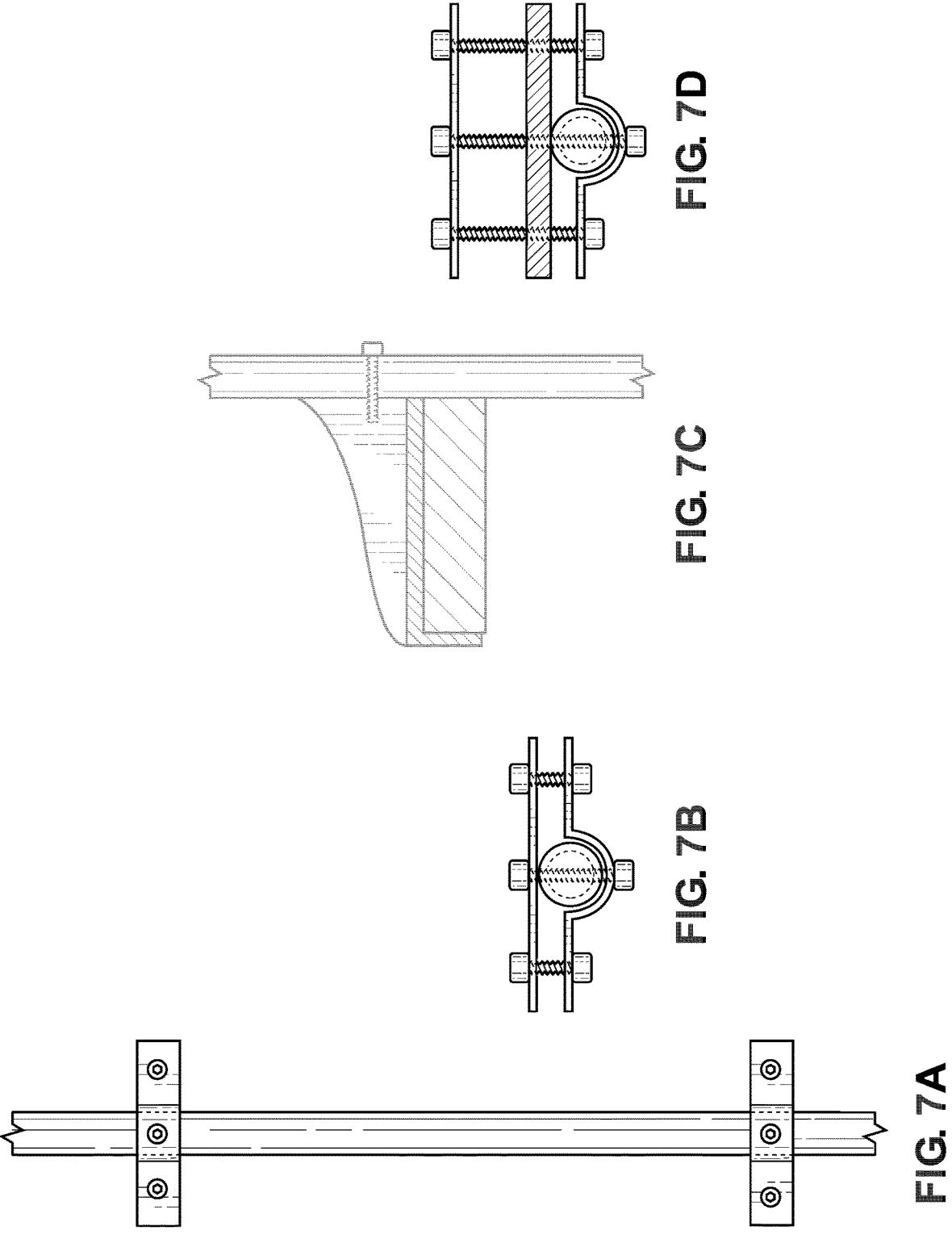
FIG. 7A is a partial front elevation view showing a leg of the privacy shade apparatus with mounting brackets in accordance with an embodiment of the present invention.
FIG. 7B is a top view of FIG. 7A.
FIG. 7C is a side sectional view showing a leg of the privacy shade apparatus with mounting bracket in accordance with an embodiment of the present invention.
FIG. 7D is top view of a leg of the privacy shade apparatus with mounting screws and spacers in accordance with an embodiment of the present invention.
Figures 8A, 8B:
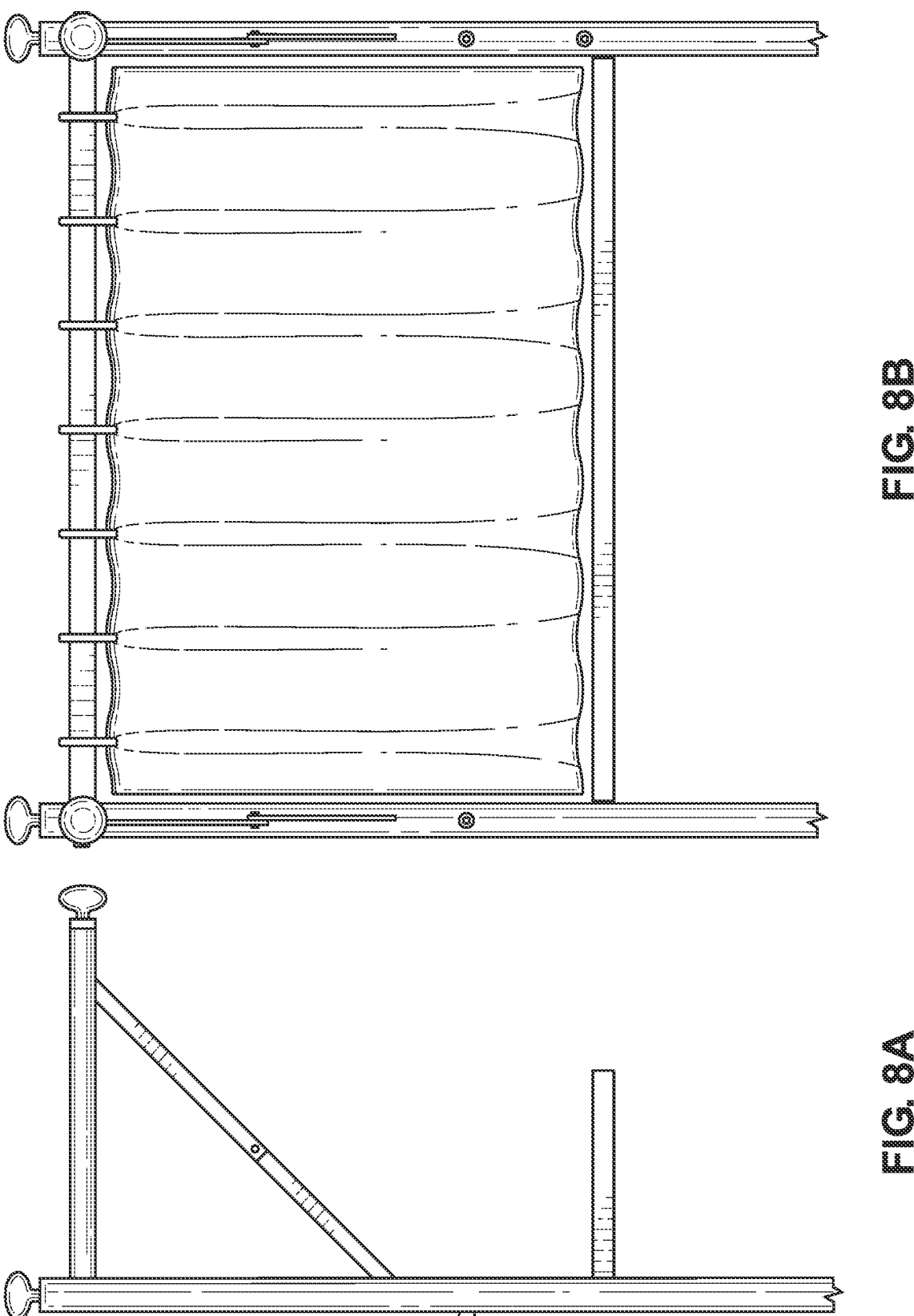
FIG. 8A is a partial side view of the privacy shade apparatus attached to a fence with optional canopy and shelf in accordance with an embodiment of the present invention.
FIG. 8B is a partial front view of the privacy shade apparatus in accordance with an embodiment of the present invention.
Figure 9:
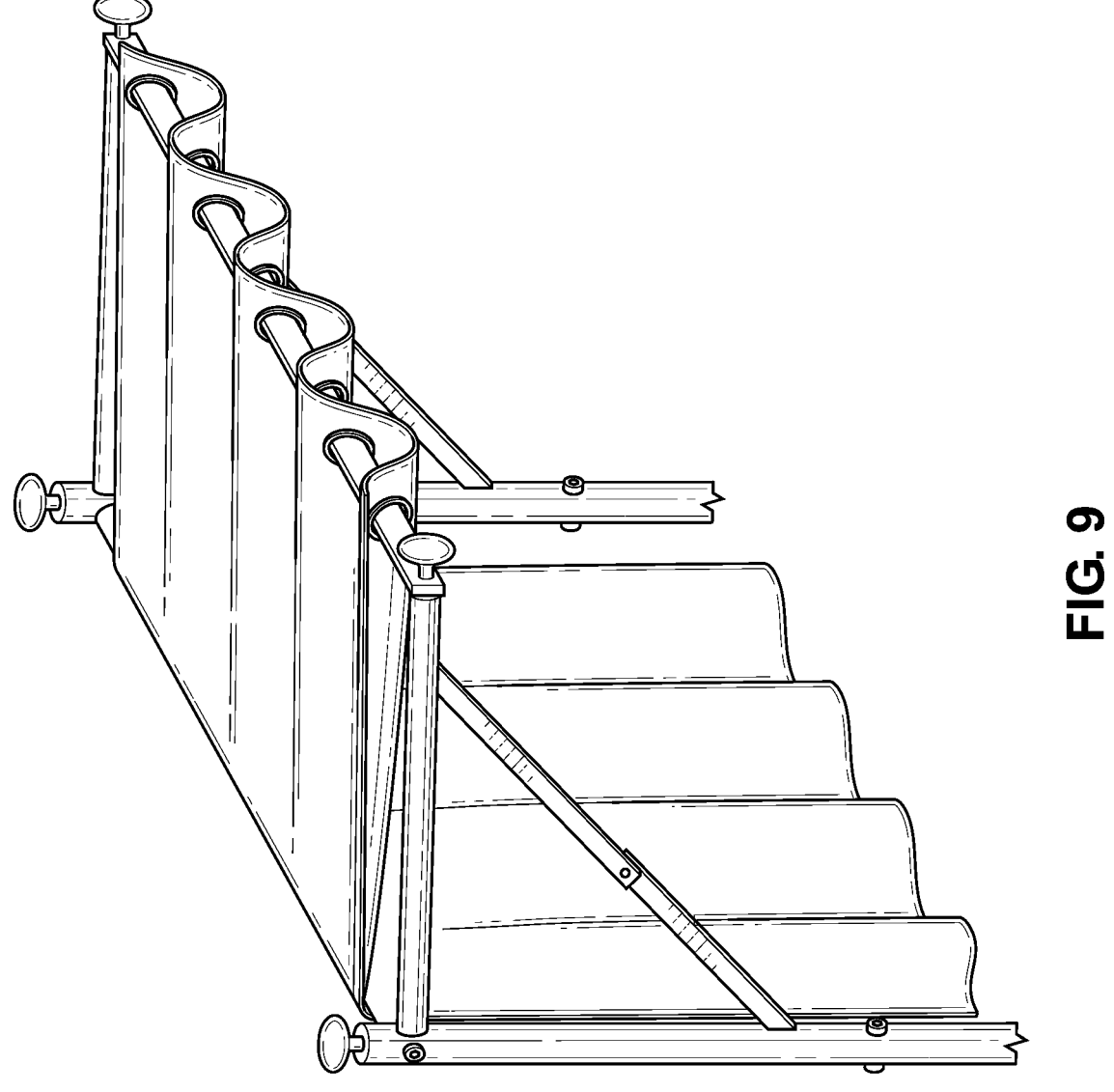
FIG. 9 is a partial perspective view of the privacy shade apparatus in accordance with an embodiment of the present invention.
Figures 10A, 10B:
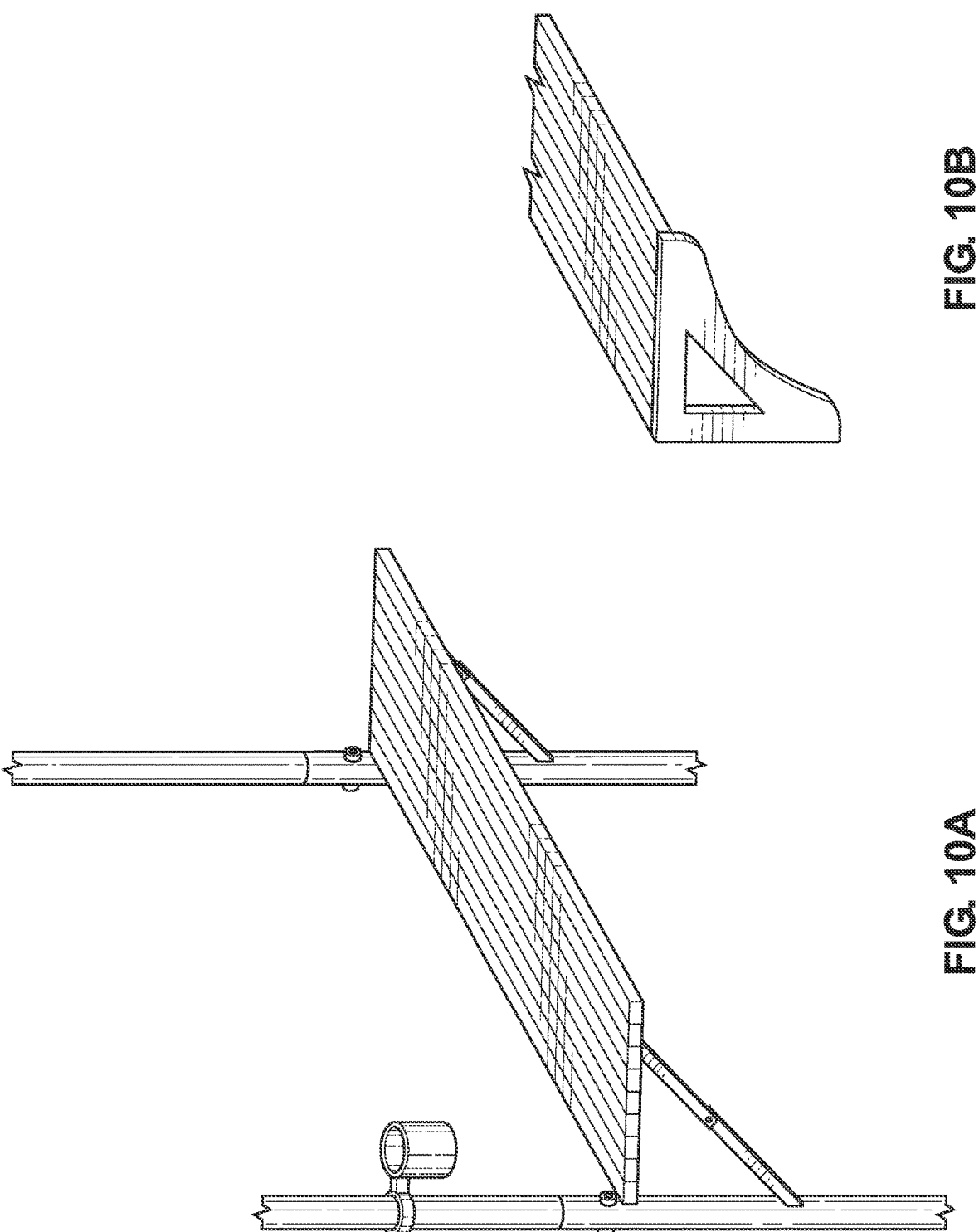
FIG. 10A is a partial perspective view of a shelf accessory and top view of a cup holder in accordance with an embodiment of the present invention.
FIG. 10B is a partial perspective view of a bracket shelf accessory in accordance with an embodiment of the present invention.
Figure 11:
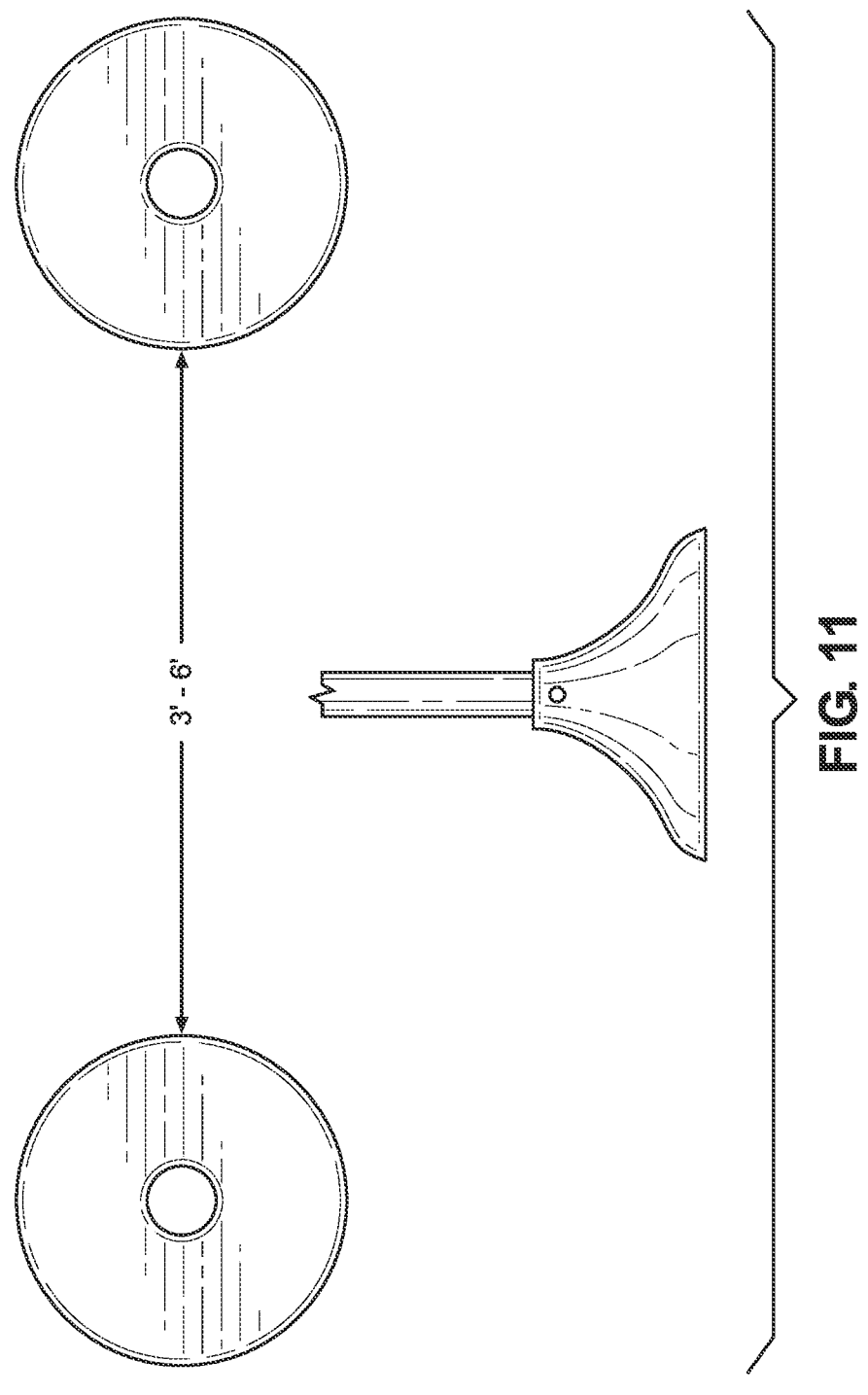
FIG. 11 shows top and side views of a platform for the privacy shade apparatus in accordance with an embodiment of the present invention.

According to another embodiment, the frame legs of the shade apparatus are extendable so the height of the shade apparatus can be adjusted as desired as shown in, e.g., FIG. 5. For example, the legs may extend telescopically, or an extension member may be attached to each bottom end of the frame legs such as by rotatably engaging outer surface grooves of the extension member with corresponding internal threading inside a bottom portion of the frame leg.

According to another embodiment, the screen serves not only as a privacy shade but also as a projection screen for displaying still or moving images. A projection TV, movie projector, or other image projector, such as a projection gaming device, can be used to project images onto the screen, thus providing entertainment while providing a privacy shade.

In yet another embodiment, a top portion of one or both legs include a solar top cap for receiving and storing solar power. More specifically, solar cells may be integrated into the top cap of the legs. Electric power can then be transmitted via conductor from the solar cells to one or more electrical devices built into the shade apparatus. For example, electrical power from the solar top cap may be provided to the spool motor and the on/off button(s) for deploying the screen. The shade apparatus may also include one or more built-in light 110a, 110b that may be powered by the solar top cap. The top cap(s) may also house batteries in addition to, or instead of, the solar cells to provide electrical power to one or more electrical devices. An electrical outlet (e.g., 120 or 240 Volt receptacle) and/or USB (Universal Serial Bus) port may also be integrated into the top cap so that a user can plug electrical devices into the outlet or USB, such as a smart phone charger or other computing device. The electrical outlet and/or USB port may be powered by the solar top cap, batteries, or both.

In addition, the privacy shade apparatus may include some accessories, as depicted in FIG. 2. For example, a shelf 220 may be attached to the frame legs so that the shelf extends between the frame legs. A user can therefore rest items on the shelf while seated or standing next to the shade apparatus. Other accessories may include a drink holder 222a, 222b attached to one or both frame legs or integrated into the shelf. In addition, the privacy shade apparatus may include a canopy. In one embodiment the canopy is suspended over a crossbeam supported by two side arms. Specifically, the shade apparatus includes side arms, one extending from each opposite side of the crossbar at right angles therefrom, and a crossbeam connecting the ends of the support arms. More specifically, the crossbeam extends between the side arms and is coplanar with the side arms and crossbar of the frame. In addition, an angled support arm extends from each frame leg and is attached to a corresponding side arm to provide support to the side arm. The crossbar, side arms, and crossbeam thus form a rectangular roof frame over which a curtain may be draped. For example, a curtain with rings along one edge can be installed on the cross beam by attaching the rings to the crossbeam or passing the crossbeam through the rings. The rest of the curtain can then be draped over the crossbar. Furthermore, the roof frame may be used to support a canopy or pergola. Specifically, a canopy or pergola may be placed on top of the roof frame. One of ordinary skill in the art will appreciate that other types of accessories may be attached to the shade apparatus, and the accessories described herein are not intended to limit the scope of the invention.

Figure 16:
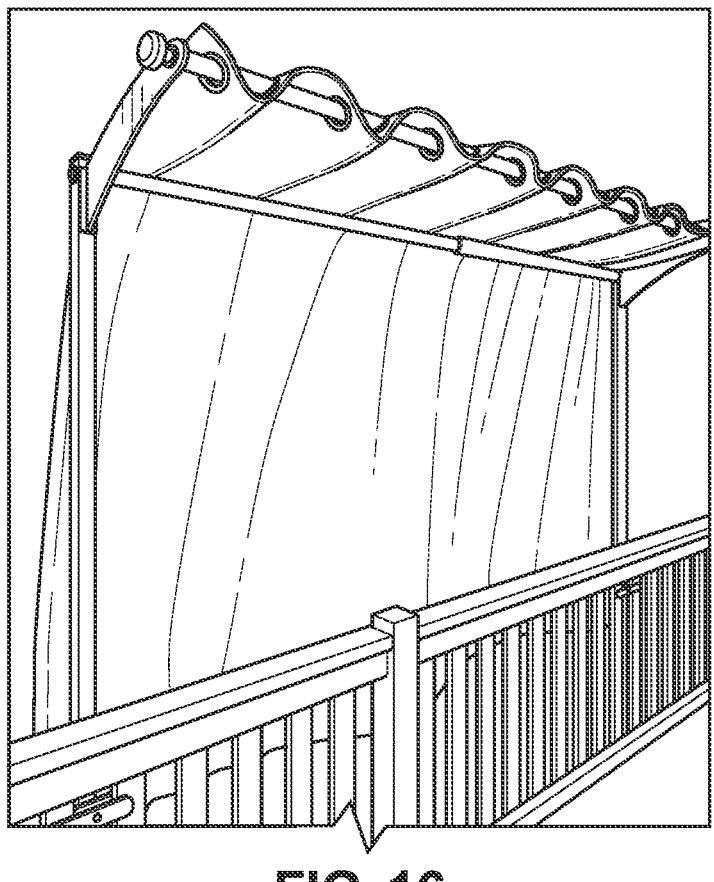
Figure 17:
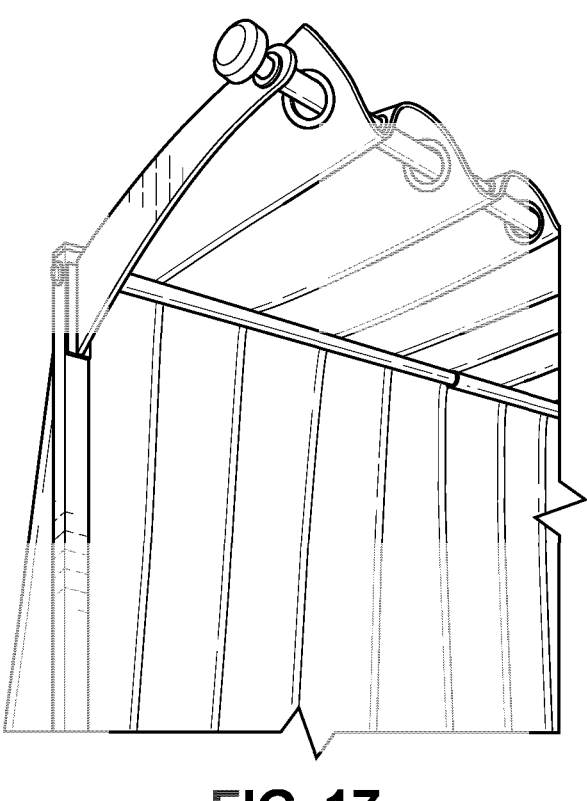
Figure 18:
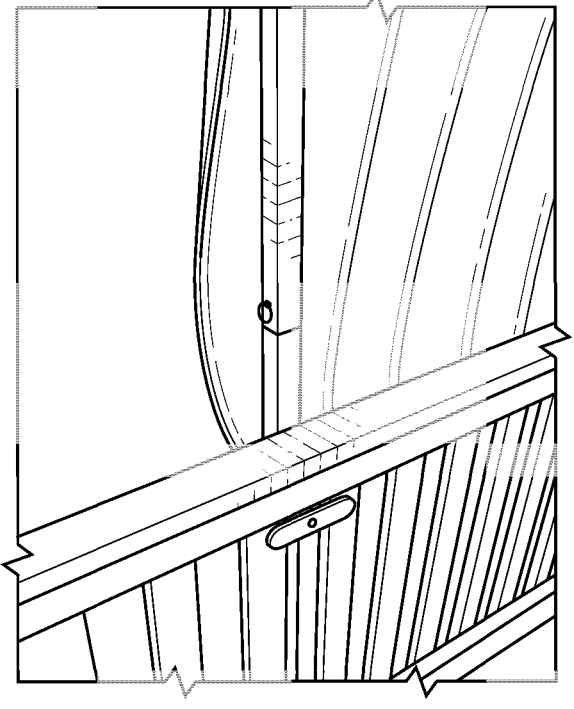

According to another embodiment of the invention shown in FIG. 16, the privacy shade apparatus includes a frame with two legs and a lateral crossbar connecting the two legs. The crossbar 420 extends between respective top portions of the two legs 410a, 410b. A side arm 422a, 422b extends from each opposite end of the crossbar and a crossbeam is attached to respective ends of the side arms. An angled support arm extends from each frame leg and attaches to a respective side arm. The crossbar, side arms, and crossbeam are coplanar and form a rectangular roof frame, while the angled support arms provide support for the roof frame. The frame legs can then be clamped to a railing or fence at any desirable position along the railing/fence.

In this embodiment, a curtain 430 may be attached to the crossbeam 420 and draped over the crossbar, such as by attaching rings along one edge of the curtain to the crossbeam or passing the crossbeam through the rings. The remaining portion of the curtain can then be draped over the crossbar. A cord may be attached to an edge or corner of the curtain allowing a user to slide the curtain back and forth along the crossbeam. The curtain thus forms a moveable shade barrier for anyone positioned in front of the privacy shade apparatus. Moreover, although this embodiment describes use of a curtain, any other type of covering may be utilized to provide privacy and shade, such as blinds, shades, drapes, a tarp, a sheet, etc. and may be made of any suitable material such as wood, faux wood, paper, plastic, metal, natural fabric, synthetic fabric, etc.

From the embodiments described above, one will appreciate that the privacy shade apparatus may be portable or more permanently fixed, such as by bolting, clamping, or drilling the shade apparatus to a railing. In addition, although the embodiments described above are designed to attach to a fence or railing, the shade apparatus can be a standalone device with a base or platform from which the legs extend. The base can rest on any relatively flat surface and may be weighted to anchor the shade apparatus in place and provide more stability (i.e., to prevent the device from falling over). The base may be a detachable piece with slots configured to receive the frame legs so that the shade apparatus can optionally serve as a standalone apparatus (i.e., no railing required) or be attached to a railing as previously described.

In addition to the privacy shade apparatus described above, a method is provided for installing the privacy shade apparatus on an existing fence or railing. The method includes the steps of removing top caps from at least two existing rail posts of a railing. The shade apparatus is then attached to the rail posts by coaxially attaching each leg of the shade apparatus frame to a corresponding rail post. Although the shade apparatus frame is described as having two legs, one of ordinary skill in the art will recognize that the frame may include more than two legs, and each leg will attach to a corresponding railing post.

As discussed above, each of the frame legs may be configured to coaxially receive a top portion of its corresponding post. However, the legs only cover the portion of the post that extends above the top rail. In this way, the top rail prevents the legs from sliding too far down the posts. Alternatively, the legs may include a pin, peg, or other extending member that fits into an opening in the post that is exposed by removing the top cap. A sleeve or bracket may also be used to secure the legs to the posts as already described.

In a further embodiment, the frame legs may or may not be hollow and are attached to their respective posts using a combination of a bracket and rotatable levers attached to a lower half or bottom portion of each leg. In this embodiment the frame legs extend below the top rail and may extend all the way to the base rail of the fence. Use of this embodiment assumes that there are spaced apart spindles that extend between the top rail and the base rail. The bracket is preferably an L-shaped bracket with a short side and a long side. The long side of the bracket extends horizontally from approximately the middle of the frame leg and the short side extends down vertically. In other words, the end of the long horizontal side of the L-shaped bracket is attached to or embedded in the leg so that the bracket extends horizontally from the leg and forms a hook thus allowing the bracket to clamp onto the top rail. In one embodiment, the bracket includes a rubber, foam, plastic, or fabric layer where it contacts the top rail in order to avoid damage to the top rail. Moreover, the bracket may be an adjustable bracket where the long side of the bracket may be extended or retracted to securely clamp the top rail. A person of ordinary skill in the art will recognize that adjustable brackets are well known in the art.

The lower half of the frame leg (i.e., the portion of the leg below bracket) extends below the top rail and may extend as far as the base rail. A rotatable lever mechanism is attached at some point along the lower half of the leg, preferably near the lower end of the leg. The rotatable lever mechanism includes two opposing, aligned levers on either side of the leg with a rotatable member extending through the leg and connecting the opposing levers. The rotatable lever mechanism is configured to rotate from a vertical position (i.e., open position) to a horizontal position (i.e., closed or locked position) and trap adjacent railing spindles, disposed on either side of the leg, between the opposing levers. In one embodiment the opposing levers are spaced apart to snugly trap a spindle when rotated into the locked position. The levers are thus able to clamp the adjacent spindles on either side of the leg. Just as with the bracket, the levers may include a rubber, foam, plastic, or fabric layer to avoid damage to the spindles trapped tightly therebetween. However, in another embodiment the levers may be sufficiently spaced apart to avoid contact with the spindle interposed therebetween when the levers are rotated into the locked position, in which case the levers do not clamp the spindles.

Accordingly, the shade apparatus is thus secured to a railing by first hooking or clamping the bracket to the top rail of the fence/railing. This can be done by resting the bracket over the top rail so that the rail is between the short vertical side and long horizontal side of the L-shaped bracket. The rotatable lever mechanism is then rotated from the open position to the locked position, thereby trapping adjacent spindles between the opposing levers on either side of the frame leg. To detach the shade apparatus from the railing, a user simply rotates the levers back to the open position and lifts the apparatus off the top rail.

According to one embodiment of the present invention, the lateral crossbar has a U-shaped cross section and the spool is suspended within the lateral crossbar. The opening in the U-shape is the opening through which the screen is deployed. In other words, the crossbar is in the form of an elongated U-shaped bracket. However, the crossbar is not limited to any particular shape. For example, the crossbar may have a rectangular or any other geometric cross section (e.g., circular, polygonal, etc.) and is hollow to accommodate the spool suspended therein. In any case, the crossbar will always include an opening for deploying the screen.

One or both opposite ends of the crossbar may be equipped with a cradle for retaining one or both opposite ends of the spool. In one embodiment, each opposite end of the spool is installed in a corresponding cradle on each opposite end of the crossbar. A release mechanism in at least one cradle is used to eject the spool with or without the screen mounted thereon.

According to another embodiment, the frame legs of the shade apparatus are extendable so the height of the shade apparatus can be adjusted as desired. For example, the legs may extend telescopically, or an extension member may be attached to each bottom end of the frame legs such as by rotatably engaging outer surface grooves of the extension member with corresponding internal threading inside a bottom portion of the frame leg.

According to another embodiment, the screen serves not only as a privacy shade but also as a projection screen sfor displaying still or moving images. A projection TV, movie projector, or other image projector, such as a projection gaming device, can be used to project images onto the screen, thus providing entertainment while providing a privacy shade.

In yet another embodiment, a top portion of one or both legs include a solar top cap for receiving and storing solar power. More specifically, solar cells may be integrated into the top cap of the legs. Electric power can then be transmitted via conductor from the solar cells to o or more electrical devices built into the shade apparatus. For example, electrical power from the solar top cap may be provided to the spool motor and the on/off button(s) for deploying the screen. The shade apparatus may also include one or more built-in light that may be powered by the solar top cap. The top cap(s) may also house batteries in addition to, or instead of, the solar cells to provide electrical power to one or more electrical devices. An electrical outlet (e.g., 120 or 240 Volt receptacle) and/or USB (Universal Serial Bus) port may also be integrated into the top cap so that a user can plug electrical devices into the outlet or USB, such as a smart phone charger or other computing device. The electrical outlet and/or USB port may be powered by the solar top cap, batteries, or both.

While multiple embodiments are disclosed, still other embodiments of the present invention will become apparent to those skilled in the art from this detailed description. The invention is capable of myriad modifications in various obvious aspects, all without departing from the spirit and scope of the present invention. Likewise, one skilled in the art will recognize that the order of certain steps in the method may be combined, deleted or rearranged without diminishing the scope of the invention. Accordingly, the drawings and descriptions are to be regarded as illustrative in nature and not restrictive.

I claim:

1. A privacy shade apparatus attachable to an existing railing, said apparatus comprising:

a shade apparatus frame comprising:

a first leg and a second leg, the first leg and the second leg being telescopically extendable in a vertical direction;

the first leg and the second leg extending below the railing when the apparatus is attached to the railing;

a first L-shaped bracket extending from a middle of the first leg;

the first L-shaped bracket configured to hook over and rest upon the railing;

a first threaded member configured to cooperate with the first L-shaped bracket to clamp the first L-shaped bracket to the railing;

a second L-shaped bracket extending from a middle of the second leg;

the second L-shaped bracket configured to hook over and rest upon the railing;

a second threaded member configured to cooperate with the second L-shaped bracket to clamp the second L-shaped bracket to the railing;

a first rotatable lever mechanism attached proximate the lower end of the first leg;

the first rotatable lever mechanism including a first pair of opposing, aligned levers on either side of the first leg with a first rotatable member extending through the first leg and connecting the first pair of opposing levers;

the first rotatable lever mechanism being configured to rotate from a vertical open position to a horizontal locked position to trap adjacent railing spindles, disposed on either side of the first leg, between the first pair of opposing levers;

a second rotatable lever mechanism attached proximate the lower end of the second leg;

the second rotatable lever mechanism including a second pair of opposing, aligned levers on either side of the second leg with a second rotatable member extending through the second leg and connecting the second pair of opposing levers;

the second rotatable lever mechanism being configured to rotate from a vertical open position to a horizontal locked position to trap adjacent railing spindles, disposed on either side of the second leg, between the second pair of opposing levers;

a lateral crossbar, having a first end and a second end;

said lateral crossbar extending between respective top portions of said first and second legs and connecting to said first leg with a first fastener and connecting to said second leg with a second fastener, said lateral crossbar being telescopically extendable in a horizontal direction;

a first side arm extending substantially perpendicularly from the first end of the lateral crossbar and the first leg;

a second side arm extending substantially perpendicularly from the second end of the lateral crossbar and the second leg;

a crossbeam attached to the first side arm and the second side arm at ends distal to the lateral crossbar;

a first angled support arm extending from the first frame leg and attached to the first side arm;

a second angled support arm extending from the second frame leg and attached to the second side arm;

the lateral crossbar, the first side arm, the second side arm, and crossbeam are substantially coplanar and form a rectangular roof frame, while the angled support arms provide support for the roof frame; and a curtain configured to be attached to the crossbeam and draped over the lateral crossbar, by attaching rings adjacent one edge of the curtain to the crossbeam or passing the crossbeam through the rings, a portion of the curtain being configured to drape over the lateral crossbar;

the curtain configured as a moveable shade barrier for a position adjacent the privacy shade apparatus.

2. The privacy shade apparatus of claim 1, further comprising:

a shelf extending between the first leg and the second leg.

3. The privacy shade apparatus of claim 1, further comprising:

a cup holder attachable to either the first leg or the second leg.

4. The privacy shade apparatus of claim 1, wherein the first leg and the second leg are each configured to be insertable in a socket of a base to facilitate use as a standalone privacy shade apparatus.

* * * * *